Jan. 23, 1945.　　　　O. LICHTWITZ　　　　2,367,952
DIVIDING HEAD
Filed Sept. 30, 1940　　　2 Sheets-Sheet 1

Inventor,
O. Lichtwitz
By: Glascock Downing & Seebold
Attys.

Jan. 23, 1945.　　　O. LICHTWITZ　　　2,367,952
DIVIDING HEAD
Filed Sept. 30, 1940　　　2 Sheets-Sheet 2
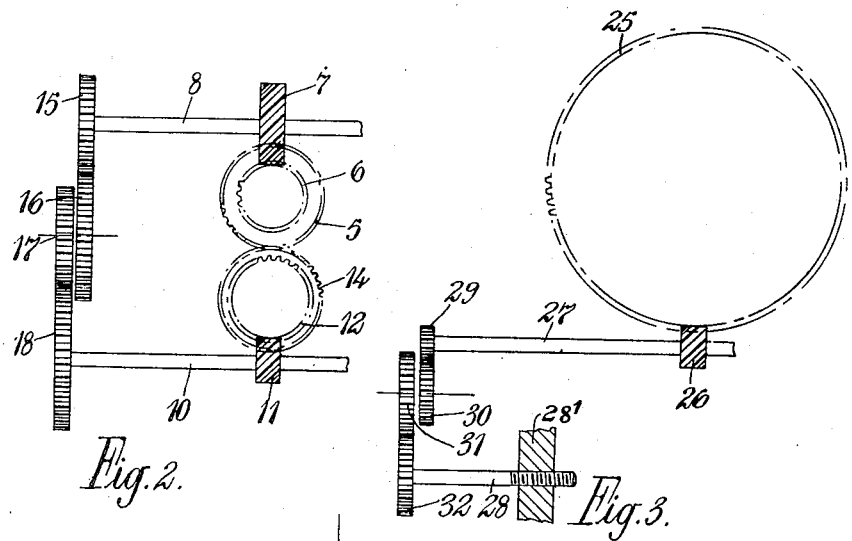
Fig.2.
Fig.3.
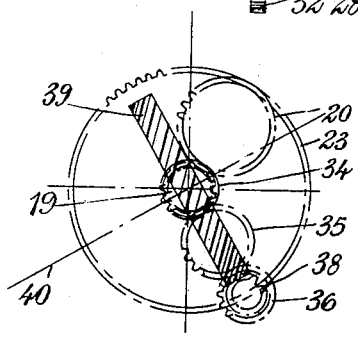
Fig.4.
Inventor,
O. Lichtwitz
By: Glascock Downing & Seebold
Attys.

Patented Jan. 23, 1945

2,367,952

UNITED STATES PATENT OFFICE 2,367,952

DIVIDING HEAD

Otto Lichtwitz, Seven Kings, England

Application September 30, 1940, Serial No. 359,121
In Great Britain August 21, 1940

12 Claims. (Cl. 90—57)

This invention relates to indexing or dividing heads for milling and like machines.

The indexing or dividing head is an important equipment of a milling machine as it enables the division or indexing of a work piece into equal angular parts and also for turning the work piece in connection with the milling of spiral grooves.

The division or indexing of a work piece may be effected by three methods, viz. simple, compound and differential dividing. Compound dividing is rather troublesome and is now seldom applied because it can be replaced by differential dividing which is easier in operation. Differential dividing is moreover the only method by which dividing or indexing into any desired number of angular parts may be effected. Differential dividing or indexing involves the provision of gearing (including change gear wheels) between the spindle of the dividing head and the dividing plate, so that on the operator turning the dividing crank, movement is imparted through such gearing to the dividing plate and consequently an additional movement is imparted to the crank, so that the compound movements are imparted to the spindle.

It will be appreciated that with known dividing or indexing heads differential indexing imposes certain restrictions on the use of the head partly for the reason that for certain work the spindle is inclined and therefore cannot be connected to the means for turning the dividing plate as such means always occupies the same position and partly for the reason that one part of the mechanism for turning the dividing plate and the dividing plate itself is used both for differential dividing and for spiral milling and obviously cannot be used simultaneously for both purposes.

For example, with known indexing heads incorporating differential indexing it is not possible to mill bevel gears for the reason that the spindle of the dividing head is inclined. On the other hand it is not possible to mill spiral gears because this is a case where the parts mentioned in the previous paragraph would have to serve for two different and independent purposes.

An object of the present invention is to provide an improved construction of indexing head by which the above-mentioned difficulty is avoided so that the head is of universal application to all types of milling whatever the number of divisions.

An aim of the invention is to derive the differential dividing or indexing from an element which is always located in the same position whereby the inclination of the work spindle may take place without affecting the head.

The invention consists in an indexing or dividing head wherein transmission means are provided which permit the use of differential dividing for all kinds of milling.

The invention also consists in an indexing or dividing head wherein the drive of the dividing plate for the purpose of differential dividing is taken from a rotary element the axis of which always occupies the same position.

The invention also consists in an indexing or dividing head wherein the drive to the spindle takes place through a transmission gear which permits the turning of the spindle during spiral milling independently of the dividing.

Further features of the invention will be hereinafter described and defined in the claims.

In the accompanying drawings:

Figures 2, 3 and 4 are diagrammatic side elevations of certain details of the drives.

Figure 1:
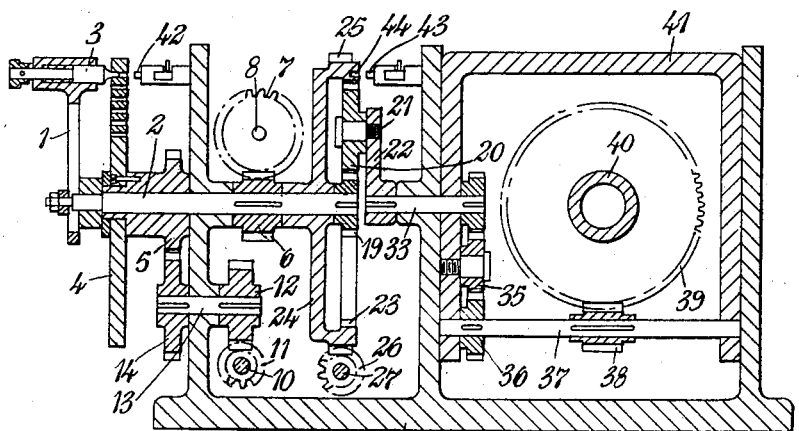
Figure 1 is a cross section of a dividing head according to the invention.

In carrying the invention into effect according to one convenient mode by way of example, see Figures 1 to 4, the dividing or indexing crank 1 is secured upon the shaft 2 and is provided with a spring plunger or pin 3 which in the usual manner engages within holes in a dividing plate 4 in order to lock the spindle during the milling period and which must be disengaged during the indexing operation.

The dividing plate 4 is secured to a spur wheel 5 mounted to rotate freely upon the shaft 2.

The shaft 2 has a worm or spiral gear 6 keyed to it which meshes with and drives a worm wheel, or spiral gear 7 secured on a shaft 8, which lies at right angles to the shaft 2, and is provided with suitable bearings which are located in fixed position on the mounting 9. Another shaft 10 arranged parallel to the shaft 8 has secured thereon a spiral gear 11 which meshes with the gear 12. The latter is secured to the shaft 13 which also carries the spur gear 14 meshing with the spur gear 5 before mentioned and by which the dividing plate 4 may be driven.

The shafts 8 and 10 may be connected by a train of change wheels 15, 16, 17, 18 (see Figure 2) whereby a drive may be transmitted from the spindle 2 to the dividing plate 4, these gears forming the essentials of the differential indexing or dividing means.

The shaft 2 has also secured upon it a sun wheel 19 which meshes with the planet gear wheel 20 carried by a pin 21 secured to the crank or arm 22. The planet gear 20 also meshes in the internal teeth 23 of the annulus 24 which is freely mounted upon the shaft 2.

The annulus 24 also has external teeth 25 meshing with a spiral gear 26 secured upon the shaft 27.

The shaft 27 may be coupled to the feed screw 28 of the table of the milling machine by means of the gear wheels 29, 30, 31, 32 shown diagrammatically in Figure 3. The feed screw 28 serves in collaboration with the nut 28' (Figure 3) which is connected with the milling machine table in known manner for feeding the work piece against the cutter. The crank or arm 22 is secured upon a shaft 33 which also carries a spur gear 34. The latter meshes with an idle gear 35 which in turn meshes with a spur gear 36 secured upon a shaft 37. The shaft 37 has keyed thereon a spiral or worm gear 38 meshing with the gear 39 on the spindle 40.

The train of gears 34, 35, 36, the shaft 37, the gears 38, 39 and spindle 40 are all mounted in the housing 41 which is capable of being oscillated or tilted about the axis of the shaft 33 and of being locked in its adjusted position (see Figure 4). By means of the planetary gear between the shafts 2 and 33 and the drive from the feed screw 28 to the shaft 27 a turning movement may be imparted to the spindle 40 irrespective of its inclination and independently of the character of the dividing transmitted by the shaft 2.

The shafts 33 and 2 it will be noted are in axial alignment.

Both the dividing plate 4 and the annulus 24 may be secured against rotation by locking pins 42 and 43 respectively which are mounted upon a mounting 9 by which the various parts are carried.

The pin 42 is engageable in the holes in the index plate while the pin 43 co-operates with a hole 44 in the annulus.

The operation of the improved dividing or indexing head will now be described in relation to various examples of work pieces.

*Example A—Spur gear having a number of teeth obtainable by simple dividing or indexing, for example 50 teeth*

The locking pin 42 is engaged in the index plate 4 to lock this against rotation. The annulus 24 is also locked against rotation by the pin 43. There are no change wheels between the shafts 8 and 10 or between the feed screw 28 and the shaft 27 the plunger 3 is (in this and all other examples hereunder) disengaged from index plate 4 during indexing operation. Under these conditions the rotation of the sun wheel 19 through the indexing crank 1 causes a rotation of the crank 22 in the same direction by a smaller angle than that of the shaft 2. This movement of the crank 22 is transmitted through shaft 33, gearing 34, 35, 36, shaft 37 and gearing 38, 39 to the spindle 40.

*Example B—Spur gear having a number of teeth obtainable by differential dividing only, for example 61 teeth*

The pin 42 is disengaged from the index plate 4 and the shafts 8 and 10 are coupled by change wheels. The annulus 24 remains locked by the pin 43 and no gearing is provided between the feed screw 28 and shaft 27. The rotation of index crank 1 causes rotary movement of the index plate 4 through the shaft 2, gear 6, 7, shaft 8, change wheels 15 to 18, shaft 10, gearing 11, 12, 14 and 5. The compound movement of the indexing crank 1 is transmitted to the spindle 40 through the planetary gear shaft 33, train of gears 34, 35, 36, shaft 37 and gearing 38, 39.

*Example C—Bevel gear having straight teeth, the number being obtainable by simple dividing*

The spindle 40 is inclined to accord with the angle of the bevel but this inclination has no effect upon the remainder of the mechanism.

The shafts 8 and 10 are not coupled by change wheels, neither is the shaft 27 geared to the feed screw 28. The index plate 4 and annulus 24 are locked by the respective pins 42 and 43. Under these conditions the dividing is effected as explained under Example A above.

*Example D—Bevel gear having straight teeth, the number of teeth being obtainable by differential dividing only*

The pin 42 is disengaged from the index plate 4 and the shafts 8 and 10 are coupled by change gear wheels. The annulus 24 is locked by the pin 43 and no gearing is provided between the shaft 27 and the feed screw 28.

The spindle 40 is inclined but as the movement of the index plate 4 is derived from the shaft 8 such inclination has no effect upon the remainder of the mechanism.

Under these conditions the operation of dividing takes place in accordance with Example B above.

*Example E—Spiral gear having a number of teeth obtainable by simple dividing*

The pin 43 is disengaged from the hole 44 in the annulus 24 and the shaft 27 is coupled to the feed screw 28 by the change wheels 29, 30, 31, 32.

Dividing is effected during a non-milling period and while the feed screw 28 is stationary. This has the effect of temporarily locking the annulus, and dividing is effected according to the operations set out in Example A above, it being appreciated that the index plate 4 is held stationary by the pin 42 and that there is no gearing between shafts 8 and 10.

When each dividing operation is effected, the pin 3 is engaged in a hole in the index plate 4. This locks the index crank 1 against rotation and also locks the sun gear 19 through the shaft 2.

During the milling operation the feed screw 28 rotates the annulus 24 through the change gear 32, 31, 30, 29, shaft 27 and gear 26. As the sun gear is locked against rotation, the rotation of the annulus 24 causes a rotation of the planet gear 20 and the crank 22 but by a smaller angle. This rotation of the crank 22 is transmitted to the spindle 40 through the shaft 33, gearing 34, 35, 36, shaft 37 and gears 38, 39.

In contrast to known dividing heads, the index crank 1 in the example under review, being locked against rotation during milling, simplifies the indexing operation.

*Example F—Spiral gear having a number of teeth obtainable by differential dividing only*

The pin 42 is freed from the index plate 4. Appropriate change gear wheels couple the shafts 8 and 10. The pin 43 is withdrawn from the hole 44 in the annulus 24 and the shaft 27 is coupled by change gear to the feed screw 28.

Dividing, which is effected while the milling machine is not working, is effected according to Example B above, it being appreciated that during this operation the annulus will be locked against rotation by the change gear between the shaft 27 and feed screw 28.

After the dividing operation the pin 3 is inserted in the appropriate hole in the index plate 4 so that the sun gear is locked against rotation. The turning of the spindle 40 is then effected during milling from the feed screw through the change gear 32, 31, 30, 29, shaft 27, gear 26, annulus 24, planet gear 20, crank 22, shaft 33, gears 34, 35, 36, shaft 37, gear 38, 39 as explained in E above.

*Example G—Bevel gear having spiral teeth with a number of teeth obtainable by simple dividing*

The pin 42 engages a hole in the index plate 4. No change gear is provided between shafts 8 and 10. The pin 43 is free of the hole in the annulus. Change gear is provided between shaft 27 and feed screw 28.

Here again the dividing operation is effected during non-milling when the feed screw is stationary, while during milling the index crank 1 is held stationary by the pin 3 engaging a hole in the index plate 4.

Dividing is effected by rotating the index crank 1 which rotates the crank 22 through the shaft 2, sun gear 19, planet gear 20 (the annulus 24 being locked by change gear between shaft 27 and stationary feed screw 28). As in Example C so in the present example, the inclination of the spindle has no influence on the dividing.

After indexing and during milling the spindle 40 is rotated through change gear 32, 31, 30, 29, shaft 27, gear 26, annulus 24, planet gear 20 (sun gear being stationary by locked index crank 1), crank 22, shaft 32, gearing 34, 35, 36, shaft 37 and gear 38, 39.

*Example H—Bevel gear having spiral teeth the number of which is obtainable by differential dividing only*

The pins 42 and 43 are both withdrawn from their respective elements 4 and 24. The shaft 8 is coupled to the shaft 10 by change gear and the feed screw 28 is similarly coupled to the shaft 27. Dividing (which is effected while milling is stopped so that the annulus is temporarily locked) is then performed as set out in Example D above. Turning of the spindle 40 during milling is effected according to Example F above, during which the sun pinion 19 is locked against rotation by the engagement of pin 3 in a hole in the index plate 4.

It will be appreciated that of the examples given above only those under paragraphs A, B, C, E and G can be carried out with known indexing or dividing heads, and that it is impossible with such heads to make the Examples D, F and H.

Although compound dividing is seldom used it will be appreciated that it is applicable for all kinds of milling. With the present invention the shafts 8 and 10 would not be connected by change gears and the operator would rotate both the crank 1 and the dividing plate 4.

It will also be noted from the above examples that the manipulation of the improved dividing or indexing head is very little different from that of known dividing heads and thus does not require an operator to learn an entirely new manipulation, especially if the construction of the dividing head enables him to use change wheels and dividing plates with the same hole circles as hitherto. The following example will make it clear how readily the improved dividing head can be exchanged for an existing head:

It is assumed that on the dividing head to be replaced there is, for example, a ratio of 1:40 between the hand or dividing crank 1 and the spindle 40 so that one revolution of the dividing crank effects $\frac{1}{40}$ revolution of the spindle. If, further, the spindle 40 is coupled by change gears having a ratio of 1:1 to the mechanism for turning the dividing plate 4, one revolution of the spindle causes one revolution of the dividing plate respectively $\frac{1}{40}$ additional revolution of the spindle. If, further, the feed screw is coupled by change gears having a ratio 1:1 to the means for turning the dividing plate, one revolution of the feed screw causes one revolution of the dividing plate, respectively $\frac{1}{40}$ revolution of the spindle.

The ratio of the numbers of teeth on the gears of the improved dividing head may be as follows: where $t_5$ represents the number of teeth on gear wheel 5 and so on:

$$t_6:t_7=1:20$$
$$t_{11}:t_{12}=1:2$$
$$t_{14}:t_5=1:1$$
$$t_{19}:t_{20}:t_{23}=1:3:7$$
$$t_{26}:t_{25}=1:7$$
$$t_{34}:t_{36}=1:1$$
$$t_{38}:t_{39}=1:5$$

Now, if the annulus is locked against rotation and the gear 19 is turned through an angle $\alpha$, the crank 22 rotates in the same direction by the angle $$\frac{t_{19}}{t_{19}+t_{23}}\alpha = \frac{1}{1+7}\alpha = \frac{1}{8}\alpha$$

and therefore one revolution of the crank 1 causes $\frac{1}{8} \times \frac{1}{1} \times \frac{1}{5} = \frac{1}{40}$ revolution of the spindle 40.

If the shafts 8 and 10 are coupled by change gears in the ratio 1:1 one revolution of the crank 1 causes $\frac{1}{20} \times \frac{1}{2} \times \frac{1}{1} = \frac{1}{40}$ revolution of the dividing plate 4. Thus if the spindle 40 makes one revolution, the gears proposed will cause $\frac{1}{40}$ additional revolution.

If the wheel 19 is locked and the annulus 24 is turned through the angle $\alpha$ the crank 22 rotates in the same direction by the angle $$\frac{t_{23}}{t_{19}+t_{23}}\alpha = \frac{7}{1+7}\alpha = \frac{7}{8}\alpha$$

If therefore the feed screw 28 is coupled to the shaft 27 by change gears having the ratio 1:1, one revolution of the feed screw causes $$\frac{1}{7} \times \frac{7}{8} \times \frac{1}{5} = \frac{1}{40}$$

revolution of the spindle.

While the preferred form of the improved dividing head is as described above which is applicable for all kinds of milling, a simplified form may be provided under certain circumstances where it may not be necessary to carry out all types of milling.

Figure 5:
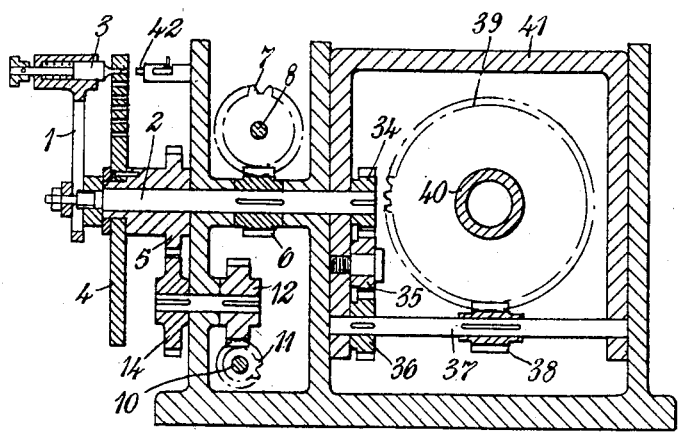
Figure 5 is a cross section of a modified dividing head.

Thus referring to Figure 5 the planetary gear is dispensed with and the gear 34 is mounted directly upon the shaft 2. In this form the shaft 10 and gears 11, 12, 14 and 5 serve both for differential dividing and for turning the spindle 40 during spiral milling. For differential dividing the shaft 10 is coupled to the shaft 8 by change gear wheels. For spiral milling the shaft 10 is coupled to the feed screw 28 by change gear wheels.

Thus work such as referred to under Examples F and H above which require differential dividing simultaneously with spiral milling cannot be performed.

Nevertheless work such as referred to under Examples A, B, C, D, E and G above can be done on the simplified form of head (Figure 5) and thus the head is more universal than those hitherto known.

I claim:

1. An indexing or dividing head comprising an indexing shaft, a dividing plate, a spindle, transmission means between the shaft and spindle, a rotary element the axis of which always occupies the same position relatively to the indexing shaft, means for driving the rotary element from the indexing shaft, and means for driving the dividing plate from said rotary element for the purpose of differential dividing.

2. An indexing or dividing head comprising an indexing shaft, a dividing plate, a spindle, transmission means between the shaft and spindle, a driven shaft the axis of which always occupies the same position relatively to the indexing shaft, a drive from the indexing shaft to said driven shaft, a shaft parallel to said driven shaft and driven from the latter, a drive from said parallel shaft to the index plate, and change gears for coupling said parallel shafts for the purpose of differential dividing.

3. An indexing or dividing head comprising an indexing shaft, a dividing plate, a spindle, means for driving the dividing plate from the indexing shaft, and means for driving the spindle from the indexing shaft, said last-mentioned means including a transmission gear which permits turning of the spindle during milling without rotating the dividing plate.

4. An indexing or dividing head comprising an indexing shaft, a dividing plate, a spindle, said indexing shaft being formed in two parts, one part carrying an indexing crank, the other part being geared to the spindle, and transmission means including a planetary gear between said parts, whereby the spindle may be turned during milling independently of dividing.

5. An indexing or dividing head for a milling machine having a feed screw comprising an indexing shaft, a dividing plate, a spindle, said indexing shaft being formed in two parts, one part carrying an indexing crank, the other part being geared to the spindle, transmission gearing including a planetary gear between said parts, said planetary gear having an annulus, a shaft geared to the annulus for rotating same and change gear for driving said shaft from said feed screw.

6. An indexing or dividing head as claimed in claim 5 wherein means are provided for locking the annulus when said change gears are removed.

7. An indexing or dividing head for a milling machine having a feed screw comprising an indexing shaft, a dividing plate, a spindle, a first transmission gearing between the indexing shaft and the indexing plate for differential dividing, a second transmission gearing between the feed screw and the spindle for spiral milling, said transmission gearings being independent of one another whereby each operation may be carried out independently of the other in respect of the same work piece, and means including a part of the second transmission gearing for driving the spindle from the indexing shaft.

8. An indexing or dividing head for a milling machine having a feed screw comprising a dividing shaft, a dividing plate, a spindle, a drive from the dividing shaft to the spindle, a shaft the axis of which is fixed relatively to the indexing shaft and is located at right angles to the dividing shaft, a drive from the driving shaft to said fixed axis shaft, a shaft parallel to said fixed axis shaft and geared to the dividing plate and sets of change gears for alternatively driving said parallel shaft from the fixed axis shaft and the feed screw.

9. An indexing or dividing head for a milling machine having a feed screw comprising a dividing shaft, a dividing plate, a spindle, a shaft axially aligned with the dividing shaft, a drive from the axially aligned shaft to the spindle, a fixed axis shaft driven from the dividing shaft, a shaft parallel with the fixed axis shaft, a drive from said parallel shaft to the dividing plate, change gears for driving said parallel shaft from said fixed axis shaft, a sun pinion on said dividing shaft meshing with a planet gear mounted upon a crank secured to said axially aligned shaft, an annulus freely mounted on the dividing shaft and having internal teeth meshing with said planet gear, said annulus having an external gear meshing with a gear wheel on a shaft, change gear for transmitting a drive to said shaft from the feed screw, and means for holding the annulus stationary when said change gear is removed.

10. An indexing or dividing head comprising an indexing shaft, a dividing plate, a spindle, a shaft the axis of which is fixed relatively to the indexing shaft, a drive from the indexing shaft through said fixed axis shaft to the dividing plate, and a planetary gear between the indexing shaft and the spindle.

11. An indexing or dividing head comprising an indexing shaft, a dividing plate rotatably mounted on the shaft, means for detachably connecting the shaft to the dividing plate for causing the latter to turn with the shaft, a spindle, transmission means between the shaft and spindle, a rotary element, the axis of which always occupies the same position relative to the indexing shaft, means for driving the rotary element from the indexing shaft, and means for driving the dividing plate from said rotary element for the purpose of differential dividing.

12. An indexing or dividing head comprising an indexing shaft, a dividing plate rotatably mounted on the shaft, means for detachably connecting the shaft to the dividing plate for causing the latter to turn with the shaft, a spindle, transmission means between the shaft and spindle, a rotary element, the axis of which always occupies the same position relative to the indexing shaft, means for driving the rotary element from the indexing shaft, means for driving the dividing plate from said rotary element for the purpose of differential dividing, and means for locking the dividing plate against rotation when desired.

OTTO LICHTWITZ.